United States Patent
Staiger

(10) Patent No.: US 8,372,934 B2
(45) Date of Patent: Feb. 12, 2013

(54) METHOD FOR PRODUCING ORGANOPOLYSILOXANES

(75) Inventor: Gerhard Staiger, Kirchdorf (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/501,896

(22) PCT Filed: Oct. 8, 2010

(86) PCT No.: PCT/EP2010/065103
§ 371 (c)(1),
(2), (4) Date: Apr. 13, 2012

(87) PCT Pub. No.: WO2011/047973
PCT Pub. Date: Apr. 28, 2011

(65) Prior Publication Data
US 2012/0202960 A1  Aug. 9, 2012

(30) Foreign Application Priority Data
Oct. 22, 2009  (DE) .......................... 10 2009 045 930

(51) Int. Cl.
*C08G 77/18* (2006.01)

(52) U.S. Cl. ............ 528/10; 528/29; 528/499; 422/129; 422/132; 422/600; 422/608; 422/620; 422/622; 422/630; 422/649

(58) Field of Classification Search .................. None
See application file for complete search history.

(56) References Cited

U.S. PATENT DOCUMENTS

| | | | |
|---|---|---|---|
| 4,209,454 A * | 6/1980 | Graf et al. ...................... | 556/457 |
| 4,252,602 A | 2/1981 | Krepler | |
| 4,296,082 A | 10/1981 | Lowe et al. | |
| 4,298,753 A * | 11/1981 | Schinabeck et al. ........... | 556/415 |
| 4,609,752 A * | 9/1986 | Giesing et al. ................. | 556/457 |
| 6,767,982 B2 * | 7/2004 | Standke et al. ................. | 528/20 |
| 7,737,292 B2 * | 6/2010 | Ackermann ................... | 556/450 |
| 8,076,438 B2 * | 12/2011 | Ackermann ................... | 528/12 |
| 2001/0041781 A1 * | 11/2001 | Reusmann ...................... | 528/10 |
| 2007/0078277 A1 | 4/2007 | Ackermann | |
| 2009/0287009 A1 | 11/2009 | Fuchs et al. | |
| 2010/0076170 A1 * | 3/2010 | Staiger ............................ | 528/29 |

FOREIGN PATENT DOCUMENTS

| | | |
|---|---|---|
| DE | 10 2006 053 157 A1 | 5/2008 |
| DE | 10 2007 004 838 A1 | 8/2008 |
| EP | 0 775 511 A1 | 5/1997 |
| JP | 8059834 A | 3/1996 |
| JP | 11-349644 A | 12/1999 |
| JP | 2007100094 A | 4/2007 |
| WO | 2008092775 A1 | 8/2008 |

OTHER PUBLICATIONS

Pawlenko, Houben-Weyl "Methoden der Organischen Chemie", vol. XIII/5, 4th edition, p. 161 (and abstract).

* cited by examiner

*Primary Examiner* — Marc Zimmer
(74) *Attorney, Agent, or Firm* — Brooks Kushman P.C.

(57) ABSTRACT

Organopolysiloxanes with consistent product properties are prepared while minimizing alcohol usage in the hydrolysis of chlorosilanes by use of a vertical continuous loop reactor having a heating unit on an ascending side of the loop which is regulated such that the temperature of the reactant mixture is within ±5° C. of a set value.

9 Claims, 2 Drawing Sheets

US 8,372,934 B2

METHOD FOR PRODUCING ORGANOPOLYSILOXANES

CROSS-REFERENCE TO RELATED APPLICATIONS

Figure 1:
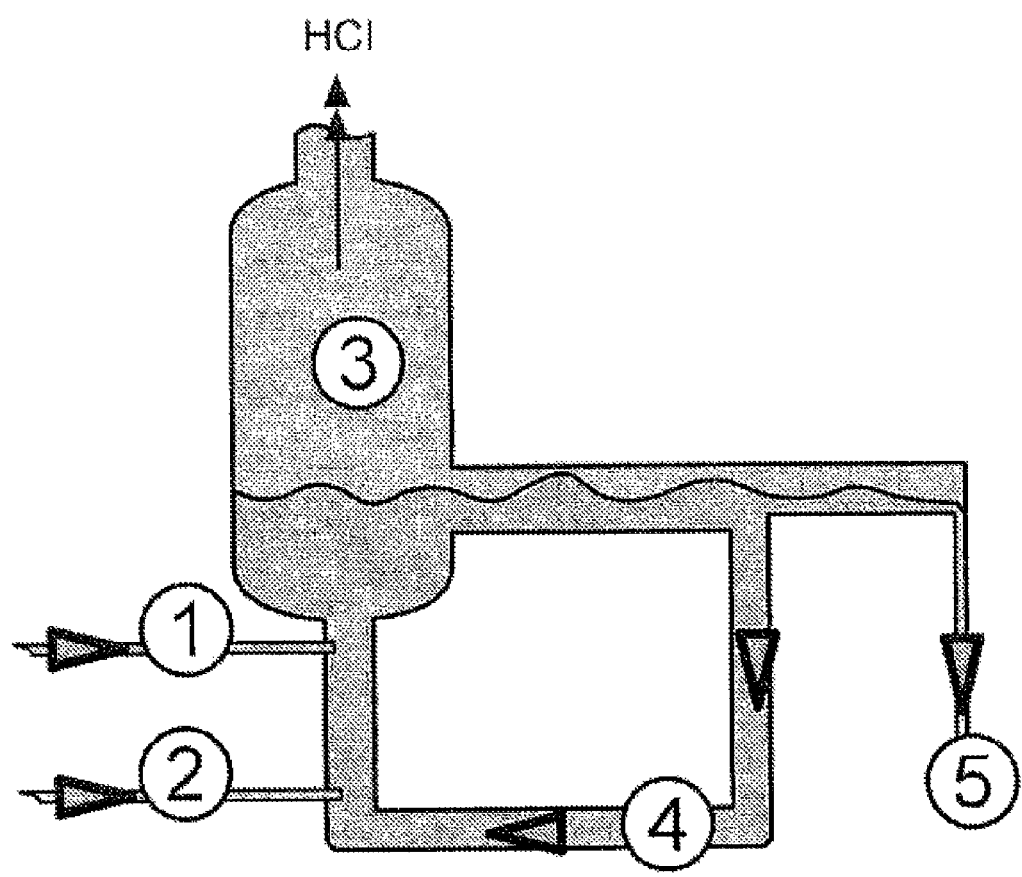

This application is the U.S. national phase of PCT Appln. No. PCT/EP2010/065103 filed Oct. 8, 2010, which claims priority to German Application No. DE 10 2009 045 930.8 filed Oct. 22, 2009, which are incorporated herein by reference.

BACKGROUND OF THE INVENTION

1. Field of the Invention

The invention relates to a multistep process for preparing organopolysiloxanes by the hydrolysis and condensation of chlorosilanes, and also to an apparatus in which the first process step can advantageously be carried out.

2. Description of the Related Art

Processes for preparing organopolysiloxanes are already known. As prior art closest to the present invention, reference may be made to DE 102007004838 A1 and references cited therein.

DE 102007004838 A1 discloses how the molecular weight, and thus further product properties of organopolysiloxanes prepared by hydrolysis can be controlled while maintaining other process parameters by means of the of pressure and temperature selected in the first process step. The other process parameters, in particular, the stoichiometry of the starting materials, reaction times, etc., are kept constant since, according to the prior art, they likewise influence the properties of the product.

The first process step is carried out in a simple, continuously operated reaction loop (see FIG. 1) which is provided with feed lines for the reactants, a degassing vessel for separating off the HCl and also an overflow. The reaction product which is obtained continuously ("partial alkoxylate") is temporarily stored in a buffer vessel before it is used in the subsequent, discontinuous hydrolysis step.

A disadvantage of the process thus described is that a large part of the hydrogen chloride liberated in the hydrolysis is not obtained in gaseous form and therefore cannot be passed to HCl recycling (reaction with methanol to form methyl chloride). The intermediate ("partial alkoxylate") obtained in the first step still contains a considerable amount of alcohol which has not reacted with chlorosilane and also hydrogen chloride ("HCl") dissolved therein. This is undesirable since the HCl gas dissolved in the alcohol has to be diluted further with water in the subsequent 2nd step of the reaction sequence and can no longer be recirculated economically to the HCl circuit. In addition, it has to be neutralized with sodium hydroxide before disposal, which is associated with further costs. The NaCl formed is subsequently introduced into public bodies of water and pollutes the environment.

SUMMARY OF THE INVENTION

It was therefore an object of the invention to improve the prior art. In this context, the process of the invention solves, in particular, 3 problems:
1) reducing the amount of alcohol used, e.g. ethanol, based on the silane mixture,
2) minimizing loss of HCl which cannot be recovered and
3) increasing the production capacity of the plant. However, it is an essential boundary condition of these process improvements that the desired end product properties are not changed. These and other objects are achieved by use of a circulation reactor containing a heating unit such that the reactor temperature can be maintained within 5° C. of a set value.

DETAILED DESCRIPTION OF THE PREFERRED EMBODIMENTS

In the conventional view of those skilled in the art, a change in the end product properties has to be expected when changing the use factor of the alcohol employed, e.g. ethanol, since the intermediate obtained in the first step is characterized essentially by the degree of reaction with alcohol such as ethanol ("degree of alkoxylation") and this substantially determines the reactivity of the intermediate and thus the course of the further reaction to form the end product and the property profile thereof. Thus, in the case of a reduction in the amount of alcohol used, e.g. ethanol, which is desirable with respect to production costs, a lower degree of alkoxylation (higher chlorine content) of the partial alkoxylate has to be expected and this leads to a higher reactivity (see, for example, S. Pawlenko, Houben-Weyl "Methoden der Organischen Chemie", vol. XIII/5, 4th edition, p. 161). As a result, a faster reaction and thus a higher molecular weight or even gelling has to be expected in the hydrolysis step.

It has now surprisingly been found that these and other objects as described above can be achieved without changing the product properties if the first reaction step is carried out in a circulation reactor which is equipped with a heating apparatus and allows the reaction temperature to be regulated, with increasing preference, to a precision of preferably 5° C., 4.5° C., 4.0° C., 3.5° C., 3.0° C., 2.5° C., 2° C., 1.5° C., or 1° C., more preferably to a precision of 0.5° C.

The invention thus provides an upright circulation reactor for the partial alkoxylation of chlorosilanes, which has separate feed lines for alcohol/water mixture and silane mixture, a degassing vessel, which is provided with a discharge line for the gaseous reaction product and also an overflow for the liquid reaction products, characterized in that the circulation reactor has a heating apparatus and a regulating device which is connected to the heating apparatus and serves to regulate the temperature in the circuit and allows the temperature in the reaction medium to be regulated to a precision of at least 5° C., with an additional phase separation unit being connected to the overflow which separates off the excess alcohol phase and recirculates it to the circulation reactor.

The circulation reactor of the invention is a vertical circulation reactor (see FIG. 2) whose interior lining consists of materials which are stable to the reaction mixture formed in the reaction of water-containing alcohol with chlorosilanes and to whose vertical tube section feed lines for the reactants alcohol/water mixture and silane (optionally silane mixture) are attached.

Above this tube section, there is a degassing vessel which allows the HCl gas formed in the reaction to be separated off and recirculated to HCl recovery. The liquid reaction products are discharged from the circulation reactor via an overflow.

Figure 2:
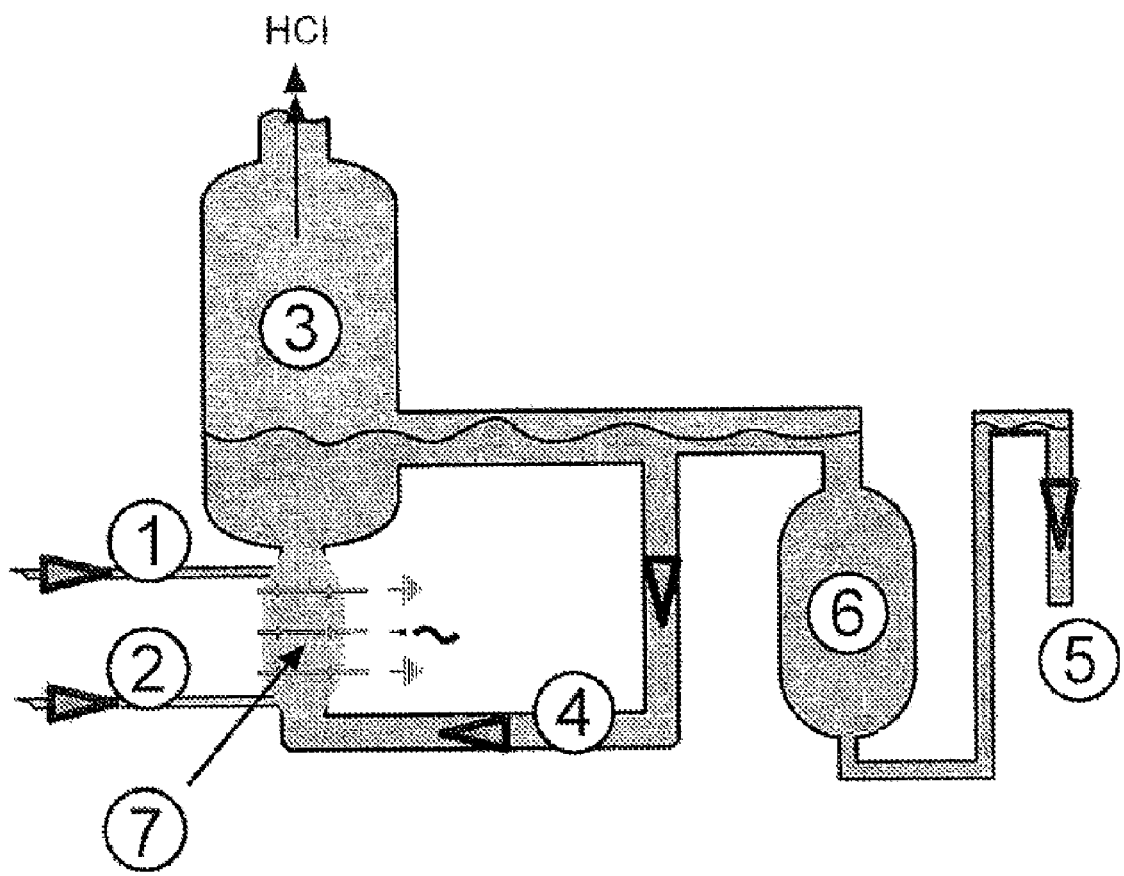

The heating apparatus according to the invention is advantageously located in the ascending part of the tube reactor in which the reactant feed lines are also sited, since HCl additionally outgasses on introduction of heat and the natural convection of the reaction mixture driven by the outgassing is additionally reinforced (see FIG. 2). As heating apparatuses, preference is given to all apparatuses customary in chemical process engineering which allow heat energy to be introduced into a chemically reactive medium. Mention may be made by way of example of heat exchangers, e.g. shell-and-tube heat exchangers operated by means of a heating medium (oil, steam), electric heating elements (heating windings, heating rods, heating plugs), electric resistance heating in a conductive medium, as has been described, for example, in DE 102006053157 A1 (see also U.S. Pat. Nos. 4,296,082 A, 4,252,602 A, EP 775511 A), and also microwave heating, induction heating.

Preference is given to conventional heat exchangers such as shell-and-tube heat exchangers which can be operated using inexpensive heating media (hot water, steam). However, in the case of an electrically conductive reaction mixture, particular preference is given to electric resistance heating. In the case of a reaction according to the invention of silanes of the formula (I)

$$R_aSiCl_{4-a} \qquad (I),$$

where the radicals R can be identical or different and are each a monovalent, SiC-bonded, optionally substituted hydrocarbon radical and a is 1, 2, 3, with a water-containing alcohol such as ethanol which preferably contains 5-30% by weight of water, more preferably 8-25% by weight of water, and most preferably 10-20% by weight of water, an electrically conductive two-phase reaction medium consisting of an alcohol phase saturated with HCl and a siloxane phase is formed. When the gas-containing, electrically conductive alcohol phase is heated by means of alternating current, virtually the entire energy is utilized for heating in the liquid. No heat-insulating gas film which prevents heat transfer is formed.

The alternating voltage is preferably at least 10 V, more preferably at least 50 V, and most preferably not more than 1000 V. The frequency of the alternating voltage is preferably at least 10 Hz, in particular at least 30 Hz, preferably not more than 10,000 Hz, and in particular not more than 10 000 Hz. The term alternating current includes three-phase current. The circulation reactor of the invention has a regulating device which regulates the temperature in the reaction medium to a precision of preferably 5° C., in a preferred embodiment 4.5° C., 4° C., 3.5° C., 3° C., 2.5° C., 2° C., 1.5° C., 1° C., most preferably 0.5° C.

The materials of the electrodes have to be electrically conductive and resistant to the reaction medium and preferably comprise graphite.

According to the invention, the circulation reactor of the invention contains, in addition to the heating apparatus, a device which is suitable for increasing the concentration of the (lighter) HCl-saturated alcohol phase of the reaction mixture in the circulation reactor. This apparatus consists, in the simplest, case of a siphon (see FIG. 2) which adjoins the overflow. The descending part of the siphon, in the sense of the flow direction of the overflow, is configured as a phase separation vessel having a relatively large cross section. Owing to the low flow velocity at this point, the alcohol phase having lower relative density separates from the siloxane phase and thus accumulates at the overflow and thus in the circulation reactor. Thus, the alcohol concentration in the circulation reactor remains high even when the amount of alcohol added is reduced. The ascending part of the siphon extends somewhat above the height of the original overflow. The overflow of the siphon determines the height of the liquid surface in the circulation reactor according to the "principle of communicating pipes".

In a further embodiment of an apparatus for recirculating alcohol to the circulation reactor, the product mixture of the partial alkoxylation ("overflow") is temporarily stored in a buffer vessel where phase separation can likewise take place before further processing in the second step. Only the siloxane phase is then used for the subsequent second step of the process, while the alcohol phase is pumped back into the circulation reactor. Buffer vessel, phase separation devices and technical recirculation facilities are in this sense also "alcohol enrichment units". It is also possible to combine a plurality of alcohol enrichment units.

The present invention further provides a process for preparing organopolysiloxanes, in which in a first continuous step chlorosilanes are reacted with from 0.10 to 0.50 mol of water per mol of hydrolyzable chlorine and with from 0.30 to 1.0 mol of alcohol per mol of hydrolyzable chlorine, where the molar ratio of water to alcohol is from 0.13 to 0.85, the ratio of water-containing alcohol to silane mixture is regulated within the abovementioned range so that the proportion of alcohol phase in the product mixture of this first step is 0-50% by weight, preferably 0-20% by weight, and most preferably 0-10% by weight, and the temperature of the reaction medium is measured by means of a heating apparatus to a temperature as a regulated variable, compared with a fixed temperature in the range 20-60° C. as a controlled variable and regulated with a precision of 5° C. to match the controlled variable, in a second step the reaction mixture obtained in the first stage is optionally mixed with a water-insoluble organic solvent having a density of less than 0.95 kg/l and water is added in an amount of from 0.2 to 100 mol of water per mol of Si component and in a third step, after the reactions of the second step are concluded, the aqueous-alcoholic phase is separated off.

In a preferred embodiment of the process, the excess alcohol phase is separated off from the reaction product from the first step and returned to the circuit.

The process of the invention is further characterized in that the end product quality (e.g. molecular weight, viscosity, etc.) is independent of the amount of alcohol used in the first reaction step if the reaction temperature is regulated to a constant temperature to a precision of preferably 5° C., in increasingly preferred embodiments, 4.5° C., 4° C., 3.5° C., 3° C., 2.5° C., 2° C., 1.5° C., 1° C., most preferably 0.5° C., by the heating apparatus installed in the circulation reactor. The range within which the amount of alcohol used can be changed, preferably reduced, without altering the product properties can be widened by recirculating the alcohol phase of the product obtained after the first reaction step ("partial alkoxylate") after phase separation to the circulation reactor. This can, as described above, advantageously be achieved by attaching a U-shaped pipe ("siphon") to the overflow of the circulation reactor.

Compared to the prior art, it is therefore possible to reduce the amount of alcohol used without altering the end product properties. Accordingly, the amount of dissolved hydrogen chloride which is dissolved in the alcohol phase and which is introduced into the second process stage and thus ultimately goes into the wastewater and cannot be recovered again, is reduced. The extent of the reaction is determined from the proportion of alcohol phase in the reaction product from the first step. Inexpensive operation is ensured at a minimal proportion of alcohol phase. If the amount of alcohol used is reduced further, a change in the end product properties has to be expected.

When the above-described phase separator is used and the alcohol phase is recirculated to the circulation reactor, the possible saving of alcohol is in the range 30-50% by weight.

As a result of the minimization of the alcohol phase in the first step, a smaller reactor volume, based on the siloxane phase, is required in the subsequent capacity-critical hydrolysis step. This applies all the more since the batch size is determined essentially by the excess water which serves to lower the HCl concentration at the end of the reaction and stop the reaction. The HCl concentration in the water phase should accordingly be below 10% by weight. The amount of excess water required is in turn greatly influenced by the HCl introduced via the HCl-saturated alcohol phase. The improvement in the space-time yield in the capacity-critical hydrolysis step ("second step" of the process) is 30-40%.

The chlorosilanes used in the first step of the process of the invention are preferably chlorosilanes of the formula

$$R_a SiCl_{4-a} \quad (I)$$

where the radicals R can be identical or different and are each a monovalent, SiC-bonded, optionally substituted hydrocarbon radical and a is 1, 2, 3.

Examples of radicals R are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals such as the vinyl and allyl radicals; cycloalkyl radicals such as cyclopentyl, cyclohexyl, cycloheptyl and methylcyclohexyl radicals; aryl radicals such as the phenyl and naphthyl radicals; alkaryl radicals such as the o-, m-, p-tolyl radicals, xylyl radicals and ethylphenyl radicals; aralkyl radicals such as the benzyl radical, and the α- and β-phenylethyl radicals.

Examples of substituted radicals R are all the radicals indicated above for R which can preferably be substituted with mercapto groups, carboxy groups, keto groups, aryloxy groups, acryloxy groups, methacryloxy groups, hydroxy groups and halogen groups.

The radicals R are preferably hydrocarbon radicals having from 1 to 8 carbon atoms, most preferably the methyl radical.

Examples of silanes of the formula (I) are methyl-trichlorosilane, dimethyldichlorosilane, trimethyl-chlorosilane, isooctyltrichlorosilane, phenyltrichloro-silane, diphenyldichlorosilane and methylphenyl-dichlorosilane.

The silanes used in the process of the invention are preferably liquid at 20° C. and a pressure of from 900 to 1100 hPa.

Preference is given to using mixtures of silanes of the formula (I) comprising at least one trichlorosilane.

For the purposes of the present invention, hydrolyzable chlorine is the chlorine which is present in the form of SiCl groups.

In the first step of the process of the invention, chlorosilanes are preferably reacted with from 0.002 to 0.75 mol, more preferably from 0.1 to 0.5 mol, of water per mol of hydrolyzable chlorine.

In the first step of the process of the invention, chlorosilanes are preferably reacted with from 0.1 to 1.5 mol, more preferably from 0.3 to 1.0 mol, of alcohol per mol of hydrolyzable chlorine.

In the first step of the process of the invention, water and alcohol preferably are used in a molar ratio of water to alcohol of from 0.13 to 0.85.

In the process of the invention, the amount of alcohol used in the first step is preferably reduced to such an extent that the proportion of alcohol phase in the total product mixture from the first step is preferably 0-50% by weight, 0.1-50% by weight, more preferably 0-40% by weight, 0.1-40% by weight, yet more preferably 0-25% by weight, 0.1-25% by weight, still more preferably 0-20% by weight, 0.1-20% by weight, in particular 0-10% by weight, and 0.1-10% by weight.

Examples of alcohols which can be used in the first step of the process of the invention are all alcohols which are liquid at a temperature of 20° C. and a pressure of from 900 to 1100 hPa, e.g. methanol, ethanol, n-propanol, i-propanol, butanol, pentanol, hexanol, and heptanol, with methanol, ethanol and butanol being preferred and ethanol being particularly preferred.

If desired, further materials in addition to chloro-silanes, water and alcohol can be used in the first step of the process of the invention. Examples of further materials which are optionally used are alkoxy-silanes such as tetraethoxysilane or water-insoluble organic solvents, preferably those having a density of less than 0.95 kg/l, e.g. toluene.

In the process of the invention, the molecular weight of the end product (organopolysiloxane) can be controlled by means of the reaction parameters of offgas pressure and reaction temperature in the first step of the production process (alkoxylation step). It has now been found that at a predetermined temperature which is kept constant (regulated) by means of a heating apparatus and is preferably in the range from 20 to 60° C., more preferably from 25 to 50° C., yet more preferably from 25 to 45° C., and most preferably 30-40° C., and a given offgas pressure which is generated by means of compressors and can be chosen freely, preferably in the range from 800 to 2000 hPa, more preferably from 1000 to 1500 hPa, most preferably from 1100 to 1400 hPa, the amount of alcohol used can be reduced without the molecular weight and properties associated therewith, e.g. viscosity, being altered.

In the first step of the process of the invention, silane or mixtures of silanes are fed continuously into a circulation reactor equipped with a heating apparatus. At the same time, a mixture of water and alcohol is fed in continuously via a further feed line, with the water content of the alcohol preferably being in the range 5-30% by weight, more preferably from 8 to 25% by weight, and most preferably 10-20% by weight. Further materials can optionally be mixed in via one of the feed lines and optionally be allowed to react. This forms alkoxysilanes, alkoxychlorosilanes and hydrolysates and condensates thereof and also, in gaseous form, hydrogen chloride, alkyl chloride and dialkyl ethers. The hydrogen chloride gas obtained in the first step can preferably be used directly in other processes, for example reacted with methanol for preparing chloromethane which is in turn used in the synthesis of methylchlorosilane. In this way, the chlorine can be recycled without having to be released into the environment.

The first step of the process of the invention is carried out in a loop reactor, preferably without introduction of mechanical energy, i.e. with only natural convection. Compared to the prior art, the loop reactor is additionally provided with a heating apparatus and preferably also with a phase separation unit by means of which any HCl-saturated alcohol phase formed can be returned to the circuit.

For the purposes of the present invention, densities indicated are based on a temperature of 20° C. and the pressure of the surrounding atmosphere, i.e. from 900 to 1100 hPa.

For the purposes of the present invention, water-insoluble organic solvents are solvents whose solubility at 25° C. and the pressure of the surrounding atmosphere, i.e. from 900 to 1100 hPa, is less than 1 g of solvent/100 g of water.

Examples of water-insoluble organic solvents, preferably ones having a density of less than 0.95 kg/l, which are optionally used in the process of the invention are preferably saturated hydrocarbons such as pentane, hexane, heptanes or octane and also branched isomers thereof and mixtures of the saturated benzene, toluene and xylenes, preferably toluene.

If a preferably water-insoluble organic solvent is used in the second step of the process of the invention, it is preferably used in amounts of from 1 to 100 mol, particularly preferably from 2 to 90 mol, in each case based on 1 mol of silicon component. Preference is given to using a water-insoluble organic solvent in the second step.

If desired, further materials can preferably also be used in the second step of the process of the invention. Examples of further materials which are optionally used are chlorosilanes such as those of the formula (I) or alkoxysilanes such as tetraethoxysilane or alcohols such as ethanol. If further materials are used in the second stage, they are preferably used in amounts of from 0.01 to 40 parts by weight, more preferably 1-20 parts by weight, based on 100 parts by weight of the silicon component used in the first step.

In the second step of the process of the invention, the silicon component of the reaction mixture obtained in the first step and any further silanes used are preferably hydrolyzed and condensed to the desired degree of polymerization by targeted addition of water.

In a preferred embodiment of the process of the invention, the reaction mixture obtained in the first step is optionally mixed with toluene in the second step, and optionally further materials, and water is introduced over a defined period of time, with the mixing operation preferably being carried out by introduction of mechanical energy, e.g. a stirrer.

In a particularly preferred embodiment of the process of the invention, the second step is preferably carried out in a batch reactor, for example a batch reactor having an internal volume of 12 m$^3$, preferably by introducing water into the batch reactor over a period of from 5 to 100 minutes while stirring.

In a further particularly preferred embodiment of the process of the invention, the water used in the second stage is preferably introduced into the reactor from above the liquid level while stirring.

The second step of the process of the invention is preferably carried out at a temperature of from 0 to 100° C., in particular from 20 to 80° C., and at a pressure of preferably from 500 to 2000 hPa, more preferably from 600 to 1500 hPa.

The hydrolysis and condensation reaction occurring in the second step can be stopped by means of any previously known methods, preferably, for example, dilution with water or neutralization with base, e.g. sodium hydroxide.

In the third step of the process of the invention, the optionally solvent-containing siloxane phase is separated from the aqueous-alcoholic hydrogen chloride phase. This can be effected by methods known to those skilled in the art, preferably, for example, by allowing the reaction mixture to stand for from 5 to 60 minutes until the phases have separated. The phase containing HCl, alcohol and water is then drained off and worked up and the siloxane-containing phase is pumped out and worked up.

The siloxane phase obtained in this way can then preferably be worked up by any methods known per se, for example neutralization, filtration and removal of all volatile constituents, preferably by distillation. The volatile constituents are preferably cyclic siloxanes and the water-insoluble organic solvent which preferably has a density of less than 0.95 kg/l. Furthermore, the concentration of the siloxane phase can, for example, be increased by removal of the solvent, for instance by distillation in a thin film evaporator, so as to produce organopolysiloxane solutions, or the solvent can be removed entirely so as to give solvent-free siloxanes.

Many organopolysiloxanes having defined properties, e.g. organopolysiloxanes containing SiC-bonded radicals, hydroxy radicals and/or alkoxy radicals, can be prepared reproducibly by the process of the invention. In particular, the process of the invention is outstandingly suitable for the preparation of organopolysiloxane resins.

The organopolysiloxanes prepared according to the invention can be solid or liquid at 20° C. and a pressure of from 900 to 1100 hPa and have an average molecular weight measured against polystyrene standards of preferably from 162 to 100,000 g/mol, more preferably from 800 to 10,000 g/mol.

The organopolysiloxanes prepared according to the invention are preferably at least partly, but more preferably, completely soluble in alkoxysilanes and/or hydroxysilanes and condensates thereof.

The organopolysiloxanes prepared according to the invention preferably have the formula

[RSiO$_{3/2}$]$_g$[R$_2$SiO]$_b$[R$_3$SiO$_{1/2}$]$_c$[SiO$_{4/2}$]$_d$[R$^1$O$_{1/2}$]$_e$ [HO$_{1/2}$]$_f$ where R is a methyl, isooctyl or phenyl radical, R$^1$ is a methyl, ethyl or butyl radical, g=2-200, b=0-100, c =0-50, d=0-10, e=0-20 and f=0-10.

Examples of organopolysiloxanes prepared according to the invention are [MeSiO$_{3/2}$]$_{72}$[Me$_2$SiO]$_{24}$[EtO$_{1/2}$]$_{2.8}$ [H$_{1/2}$]$_{0.4}$, [MeSiO$_{3/2}$]$_{12.2}$[Me$_2$SiO]$_{3.3}$[Me$_3$SiO$_{1/2}$]$_{1.4}$ [EtO$_{1/2}$]$_{0.6}$[HO$_{1/2}$]$_{0.18}$, [MeSiO$_{3/2}$]$_{15.3}$[Me$_2$SiO]$_{2.6}$ [Me$_3$SiO$_{1/2}$]$_1$[IOSiO$_{3/2}$]$_{0.8}$[MeO$_{1/2}$]$_2$-[HO$_{1/2}$]$_{0.3}$and [PhSiO$_{3/2}$]$_{9.8}$[Me$_2$SiO]$_2$[MeO$_{1/2}$]$_{1.8}$[BuO$_{1/2}$]$_{0.04}$-[HO$_{1/2}$]$_{0.18}$, where Me is the methyl radical, Et is the ethyl radical, IO is the isooctyl radical, Ph is the phenyl radical and Bu is the butyl radical.

The organopolysiloxanes prepared according to the invention can be used for all purposes for which organopolysiloxanes have also been used hitherto, for example in building protection, in the coating sector, in cosmetic products, in the textile sector and also in paper. They are particularly suitable for producing emulsions and as binders for the production of paints and varnishes.

The process of the invention has the advantage that it is simple to carry out and organopolysiloxanes can be prepared in a high yield, and the additional advantage that any water-insoluble organic solvent used, hydrogen chloride and alcohol can be recovered in a simple way.

Compared to the prior art, the process of the invention also has the advantage that the alcohol phase of the partial alkoxylate has become smaller compared to the siloxane phase and larger hydrolysis batches are thus possible so that a larger manufacturing capacity is achieved in existing apparatuses.

The process of the invention gives organopolysiloxanes which have a high storage stability, are very low in chloride, have a low VOC content and are very inexpensive to prepare.

Furthermore, the process has the advantage that organopolysiloxanes which are solid at ambient temperature and have a glass transition temperature (Tg) of up to 55° C. (heating rate: 6° C. per minute) can be prepared.

FIGURES

FIG. 1

FIG. 1 schematically shows a circulation reactor according to the prior art. The circulation reactor for the partial alkoxylation of chlorosilanes has separate feed lines for alcohol/water mixture 1 and silane mixture 2, a degassing vessel 3 which is provided with a discharge line for the gaseous reaction product, the loop 4 and an overflow for the liquid reaction products 5.

FIG. 2

FIG. 2 schematically shows a circulation reactor of the invention. The circulation reactor for the partial alkoxylation of chlorosilanes has separate feed lines for alcohol/water mixture 1 and silane mixture 2, a degassing vessel 3 which is provided with a discharge line for the gaseous reaction product, a heating apparatus 7 including a regulating device and also a phase enrichment unit 6, the loop 4 and an overflow for the liquid reaction products 5.

In the following examples, all parts and percentages are, unless indicated otherwise, by weight. Unless indicated otherwise, the following examples are carried out at the pressure of the surrounding atmosphere, i.e. at about 1000 hPa, and, unless indicated otherwise, at room temperature, i.e. about 20° C., or a temperature which is established on combining the reactants at room temperature without additional heating or cooling. All viscosities indicated in the examples are at a temperature of 25° C.

EXAMPLE 1

Reference Example 1000 kg/h of a chlorosilane mixture composed of 800 kg/h of methyltrichlorosilane and 200 kg/h of dimethyldichlorosilane and 700 kg/h of a mixture of 638 kg/h of ethanol and 62 kg/h of water are metered continuously into a continuously operated reaction loop having an internal volume of 1.35m$^3$, of which 0.85 m$^3$ is degassing volume, and natural convection. The reaction temperature is 30° C., the gauge pressure is 100 mbar and the average residence time of the siloxane phase is 20-24 minutes. During the reaction, 300-350 kg/h of hydrogen chloride are liberated and this is fed to the hydrogen chloride recovery plant.

For the hydrolysis/condensation, 2500 kg of the resulting HCl-concentrated partial alkoxylate, which consists of about 1250 kg of siloxane phase and about 1250 kg of ethanol/HCl phase, are placed together with 3000 kg of toluene in a batch reactor having an internal volume of 12 m$^3$ and 510 kg of water are metered in over a period of 75 minutes with good mixing. The reaction temperature is up to 60° C., the gauge pressure does not exceed the gauge pressure reached in the 1st substep of the reaction.

The acid concentration is then reduced to an unreactive level (HCl content in the acid/ethanol/water phase less than 14% by weight) by addition of 3050 kg of water. After careful mixing for 5-15 minutes, the mixture is drained into a 12 m$^3$ vessel and allowed to stand for 60 minutes.

The ethanol/hydrogen chloride/water-containing phase is subsequently separated from the toluene-containing siloxane phase.

In further work-up steps, the toluene-containing resin phase is concentrated to a higher solids content in a distillation column operated using packing elements (temperature at the bottom 114° C., gauge pressure at the bottom 100 mbar, residence time 60 minutes), neutralized by means of sodium bicarbonate, freed of catalytically active metal traces by means of activated carbon and subsequently filtered through filter aid and freed of volatile constituents in a thin film evaporator (120-200° C.) at a reduced pressure of from 50 to 100 mbar. The toluene obtained in the reaction step of concentration and thin film evaporation is reused in the second reaction step. The acidic ethanolic/aqueous phase from the third step (phase separation) is made alkaline and redistilled and reused in the first reaction step.

An organopolysiloxane having an average formula of [MeSiO3/2]72[Me2SiO2/2]23.9[EtO1/2]2.8[HO1/2]0.4 as determined by 1H-, 29Si-NMR and GPC spectroscopy (measured against polystyrene standards, taking into account the weight average Mw) is obtained.

EXAMPLE 2

1000 kg/h of a chlorosilane mixture composed of 800 kg/h of methyltrichlorosilane and 200 kg/h of dimethyldichlorosilane and 450 kg/h of a mixture of ethanol (360 kg/h) and water (90 kg/h) are continuously metered into a circulation reactor according to the invention which has an internal volume of 1.35 m$^3$, of which 0.85 m$^3$ is degassing volume, and natural convection and is equipped with electric resistance heating corresponding to DE102006053157 A1, which is operated at a heating power of up to 50 kW, and is additionally provided with a phase separation vessel for increasing the concentration of the ethanol phase in the circuit, as shown in FIG. 2, component (6). The reaction temperature is regulated to 30° C. by means of the heating element, the gauge pressure is 100 mbar and the average residence time of the siloxane phase is 20-24 minutes. During the reaction, 550-600 kg/h of hydrogen chloride are liberated and this is fed to the hydrogen chloride recovery plant.

For the hydrolysis/condensation, 2500 kg of the resulting HCl-concentrated partial alkoxylate, which consists of about 2100 kg of siloxane phase and about 400 kg of ethanol/HCl phase, are placed together with 3900 kg of toluene in a batch reactor having an internal volume of 12 m$^3$ and 560 kg of water are metered in over a period of 75 minutes with good mixing. The reaction temperature is up to 60° C., the gauge pressure does not exceed the gauge pressure reached in the 1st substep of the reaction.

The acid concentration is then reduced to an unreactive level (HCl content in the acid/ethanol/water phase less than 14% by weight) by addition of 2950 kg of water. After careful mixing for 5-15 minutes, the mixture is drained into a 12 m$^3$ vessel and allowed to stand for 60 minutes.

2100 kg of siloxane phase (comparative example 1: 1250 kg) are thus reacted in the same time as in comparative example 1.

The ethanol/hydrogen chloride/water-containing phase is subsequently separated from the toluene-containing siloxane phase.

In further work-up steps, the toluene-containing resin phase is concentrated to a higher solids content in a distillation column operated using packing elements (temperature at the bottom 114° C., gauge pressure at the bottom 100 mbar, residence time 60 minutes), neutralized by means of sodium bicarbonate, freed of catalytically active metal traces by means of activated carbon and subsequently filtered through filter aid and freed of volatile constituents in a thin film evaporator (120-200° C.) at a reduced pressure of from 50 to 100 mbar. The toluene obtained in the reaction step of concentration and thin film evaporation is reused in the second reaction step. The acidic ethanolic/aqueous phase from the third step (phase separation) is made alkaline and redistilled and reused in the first reaction step.

An organopolysiloxane having an average formula of [MeSiO3/2]72[Me2SiO2/2]23.9[EtO1/2]2.8[HO1/2]0.4 as determined by 1H-, 29Si-NMR and GPC spectroscopy (measured against polystyrene standards, taking into account the weight average Mw) is obtained.

The invention claimed is:

1. An upright circulation reactor for the partial alkoxylation of chlorosilanes, comprising feed lines for an alcohol/water mixture and a silane mixture, a degassing vessel provided with a discharge line for gaseous reaction products, and an overflow for liquid reaction products, wherein the circulation reactor comprises a tube reactor having a heating apparatus on an ascending part of the tube reactor, the heating apparatus further comprising a regulating device associated with the heating apparatus which regulates the temperature in a circuit of the circulation reactor and allows the temperature in the reaction medium to be regulated to a precision of at least ±5° C., and a phase separation unit connected to an overflow from the circulation reactor which separates an excess alcohol phase from a polyorganosiloxane-containing phase and recirculates the alcohol to the circulation reactor.

2. The circulation reactor of claim 1, wherein the regulating device regulates the temperature in the reaction medium to a precision of ±0.5° C.

3. A process for preparing organopolysiloxanes, comprising:
in a first continuous step, reacting chlorosilanes with from 0.10 to 0.50 mol of water per mol of hydrolyzable chlorine and with from 0.30 to 1.0 mol of alcohol per mol of hydrolyzable chlorine, where the molar ratio of water to alcohol is from 0.13 to 0.85, and regulating the ratio of water-containing alcohol to silane mixture within the above-mentioned ranges such that the proportion of alcohol phase in the product mixture of the first step is 0.1-50% by weight, and measuring the temperature of the reaction medium by means of a heating apparatus comprising a temperature measuring and regulating device associated with the heating apparatus to a temperature as a regulated variable, comparing the measured temperature with a predetermined temperature in the range 20-60° C. as a controlled variable, and regulating the temperature with a precision of ±5° C. from the controlled variable, in a second step, optionally mixing the reaction mixture obtained in the first stage with a water-insoluble organic solvent having a density of less than 0.95 kg/l, and adding water in an amount of from 0.2 to 100 mol of water per mol of chlorosilane, and in a third step, after reacting in the second step is concluded, separating an aqueous-alcoholic phase from an organopolysiloxane-containing phase.

4. The process of claim 3, wherein the amount of alcohol in the first step is reduced to an extent that the proportion of alcohol phase in the total product mixture from the first step is 0.1-40% by weight.

5. The process of claim 3, wherein the amount of alcohol is reduced to an extent that the proportion of alcohol phase in the total product mixture from the first step is 0.1-25% by weight.

6. The process of claim 3, wherein the temperature is regulated to a predetermined temperature in the range of from 25 to 45° C.

7. The process of claim 3, wherein a water-insoluble solvent is used in the second step.

8. The process of claim 3, wherein the first step is carried out in a circulation reactor of claim 1.

9. The process of claim 3, wherein the first step is carried out in a circulation reactor of claim 2.

* * * * *